US012613708B2

(12) United States Patent
Banik et al.

(10) Patent No.: US 12,613,708 B2
(45) Date of Patent: Apr. 28, 2026

(54) PRE-OPERATING SYSTEM DISPLAY BRIGHTNESS MANAGEMENT BASED ON BATTERY CONDITION

(71) Applicant: Intel Corporation, Santa Clara, CA (US)

(72) Inventors: Subrata Banik, Bangalore (IN);
Kunjal Parikh, Fremont, CA (US);
Rajaram Regupathy, Bangalore (IN);
Barnali Sarkar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 913 days.

(21) Appl. No.: 17/390,268

(22) Filed: Jul. 30, 2021

(65) Prior Publication Data

US 2021/0357234 A1     Nov. 18, 2021

(51) Int. Cl.
*G06F 1/32*      (2019.01)
*G06F 1/3234*     (2019.01)
*G06F 9/44*      (2018.01)
*G06F 9/4401*     (2018.01)

(52) U.S. Cl.
CPC .......... *G06F 9/4406* (2013.01); *G06F 1/3234* (2013.01)

(58) Field of Classification Search
None
See application file for complete search history.

(56) References Cited

U.S. PATENT DOCUMENTS

| | | | | |
|---|---|---|---|---|
| 9,564,104 | B1 * | 2/2017 | Letourneur ............ | G09G 3/344 |
| 2011/0154007 | A1 * | 6/2011 | Juvonen ................ | G06F 9/4401 |
| | | | | 713/340 |
| 2014/0006807 | A1 * | 1/2014 | Oglesby ................. | G06F 1/263 |
| | | | | 713/300 |
| 2014/0111030 | A1 * | 4/2014 | Chou ...................... | G06F 1/305 |
| | | | | 307/130 |
| 2015/0089210 | A1 * | 3/2015 | Lai ........................ | G06F 9/4401 |
| | | | | 713/2 |
| 2015/0113306 | A1 * | 4/2015 | Amemura ................. | G06F 1/24 |
| | | | | 713/323 |
| 2016/0048365 | A1 * | 2/2016 | Henderson .............. | G06F 3/147 |
| | | | | 345/473 |
| 2016/0116974 | A1 * | 4/2016 | Ginnela ................ | H04M 19/04 |
| | | | | 713/2 |
| 2016/0259649 | A1 * | 9/2016 | Poornachandran ... | G06F 1/3203 |
| 2017/0300108 | A1 * | 10/2017 | Yang .......................... | G06F 1/28 |
| 2018/0357949 | A1 * | 12/2018 | Wang .................... | G09G 3/3225 |
| 2021/0089326 | A1 * | 3/2021 | Banik ..................... | G06F 1/263 |
| 2021/0149441 | A1 * | 5/2021 | Bartscherer .......... | G06F 1/1616 |

* cited by examiner

*Primary Examiner* — Danny Chan
(74) *Attorney, Agent, or Firm* — Banner & Witcoff, Ltd.

(57)      ABSTRACT

Particular embodiments described herein provide for an electronic device that includes a battery, a display, an embedded controller to determine a battery condition and set an indicator when then battery condition is at a low power state, and a basic input/output system (BIOS), where, before an operating system stage of a boot process, the BIOS sets a brightness of the display at a native brightness if the indicator is not set and sets the brightness of the display at a low power brightness to reduce the brightness of the display if the indicator is set. In an example, the embedded controller sets the indicator before the central processing unit is reset during the boot process.

18 Claims, 9 Drawing Sheets

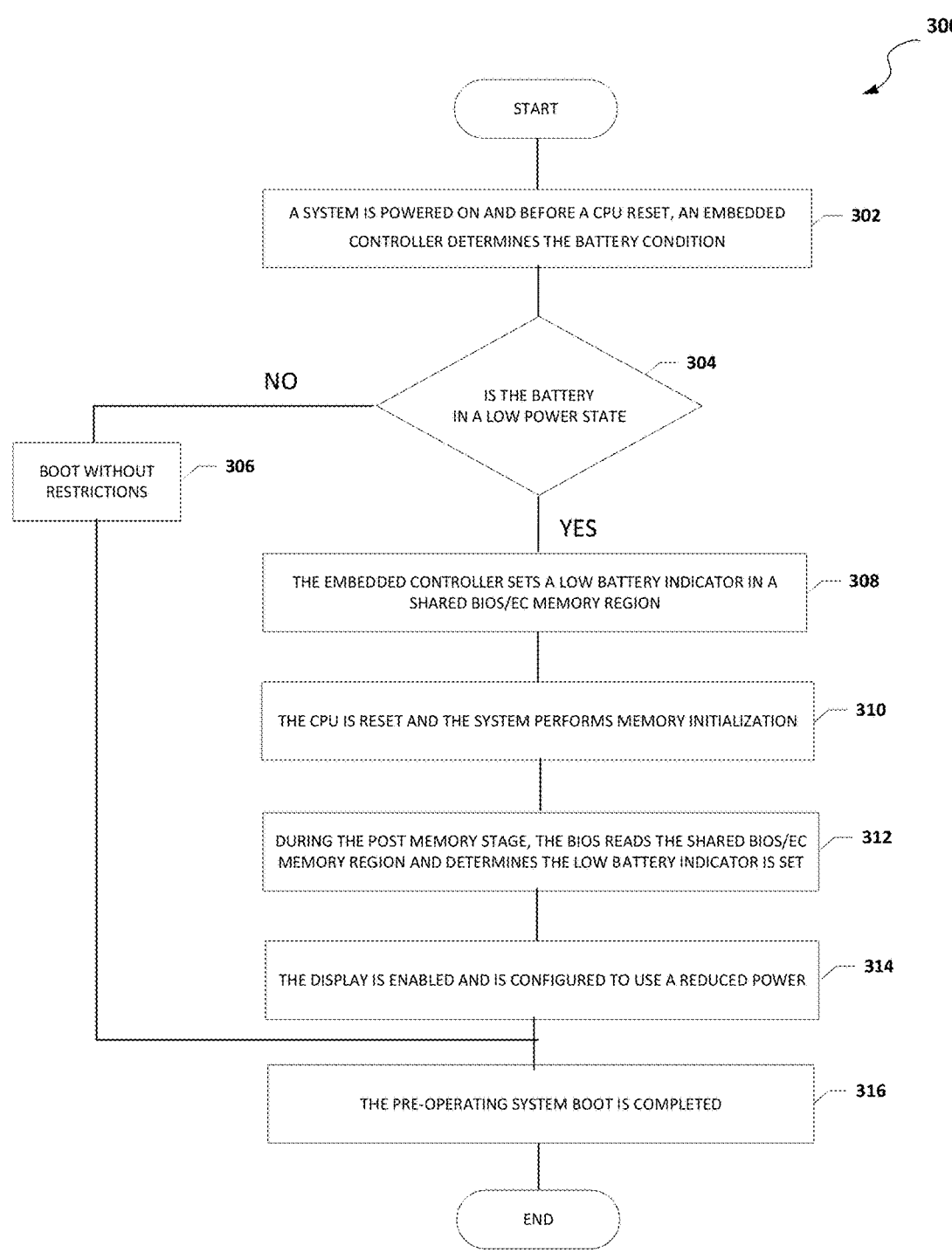

300

START

A SYSTEM IS POWERED ON AND BEFORE A CPU RESET, AN EMBEDDED CONTROLLER DETERMINES THE BATTERY CONDITION — 302

304

IS THE BATTERY IN A LOW POWER STATE

NO

BOOT WITHOUT RESTRICTIONS — 306

YES

THE EMBEDDED CONTROLLER SETS A LOW BATTERY INDICATOR IN A SHARED BIOS/EC MEMORY REGION — 308

THE CPU IS RESET AND THE SYSTEM PERFORMS MEMORY INITIALIZATION — 310

DURING THE POST MEMORY STAGE, THE BIOS READS THE SHARED BIOS/EC MEMORY REGION AND DETERMINES THE LOW BATTERY INDICATOR IS SET — 312

THE DISPLAY IS ENABLED AND IS CONFIGURED TO USE A REDUCED POWER — 314

THE PRE-OPERATING SYSTEM BOOT IS COMPLETED — 316

END

FIGURE 3

736 BLUETOOTH

738 MODEM

740 GPS 742 802.11 WiFi

700 SOC

MIPI | HDMI

710 LCD VIDEO I/F

708 VIDEO CODEC

706 GPU

702b CORE

716 L2 CACHE

702a CORE

704 L2 CACHE CONTROL

714 BUS INTERFACE UNIT

712 INTERCONNECT

728 SPI MASTER

724 FLASH CONTROLLER

734 FLASH

722 SDRAM CONTROLLER

732 DRAM

720 BOOT ROM

718 SIM I/F

730 POWER CONTROL

PRE-OPERATING SYSTEM DISPLAY BRIGHTNESS MANAGEMENT BASED ON BATTERY CONDITION

TECHNICAL FIELD

This disclosure relates in general to the field of computing, and more particularly, to a system for enabling pre-operating system display management.

BACKGROUND

End users have more electronic device choices than ever before. A number of prominent technological trends are currently afoot and these trends are changing the electronic device landscape. Some of the technological trends involve a device that includes a display and a battery that powers the device.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified flowchart illustrating potential operations that may be associated with the system in accordance with an embodiment of the present disclosure;

Figure 1A:
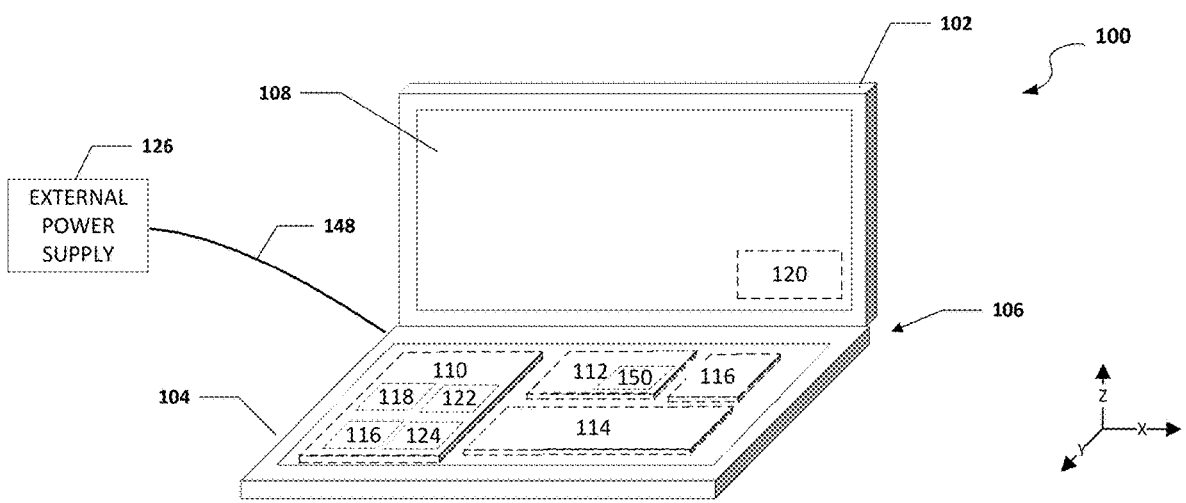
FIGS. 1A-1C are a simplified block diagram of a system to enable pre-operating system display management, in accordance with an embodiment of the present disclosure.

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to enabling pre-operating system display management in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example. The terms "similar," "substantially," "close," "approximately," "near," and "about," generally refer to being within +/−20% of a target value based on the context of a particular value as described herein or as known in the art.

The terms "over," "under," "below," "between," and "on" as used herein refer to a relative position of one layer or component with respect to other layers or components. For example, one layer or component disposed over or under another layer or component may be directly in contact with the other layer or component or may have one or more intervening layers or components. Moreover, one layer or component disposed between two layers or components may be directly in contact with the two layers or components or may have one or more intervening layers or components. In contrast, a first layer or first component "directly on" a second layer or second component is in direct contact with that second layer or second component. Similarly, unless explicitly stated otherwise, one feature disposed between two features may be in direct contact with the adjacent features or may have one or more intervening layers.

Figure 1B:
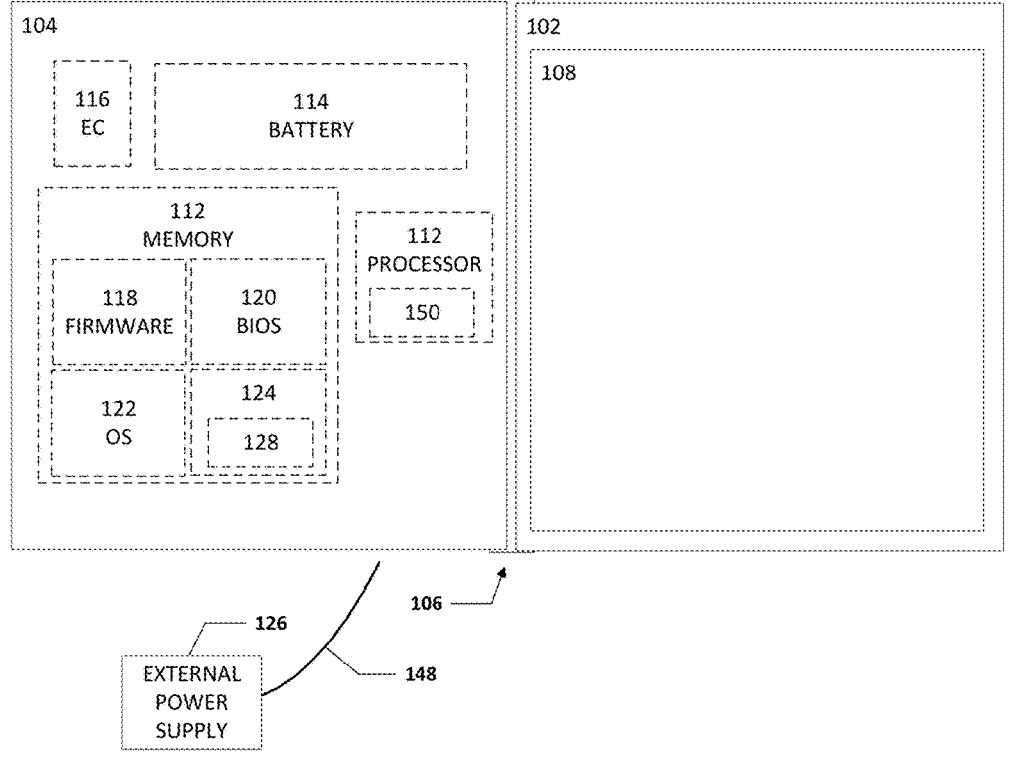
Figure 1C:
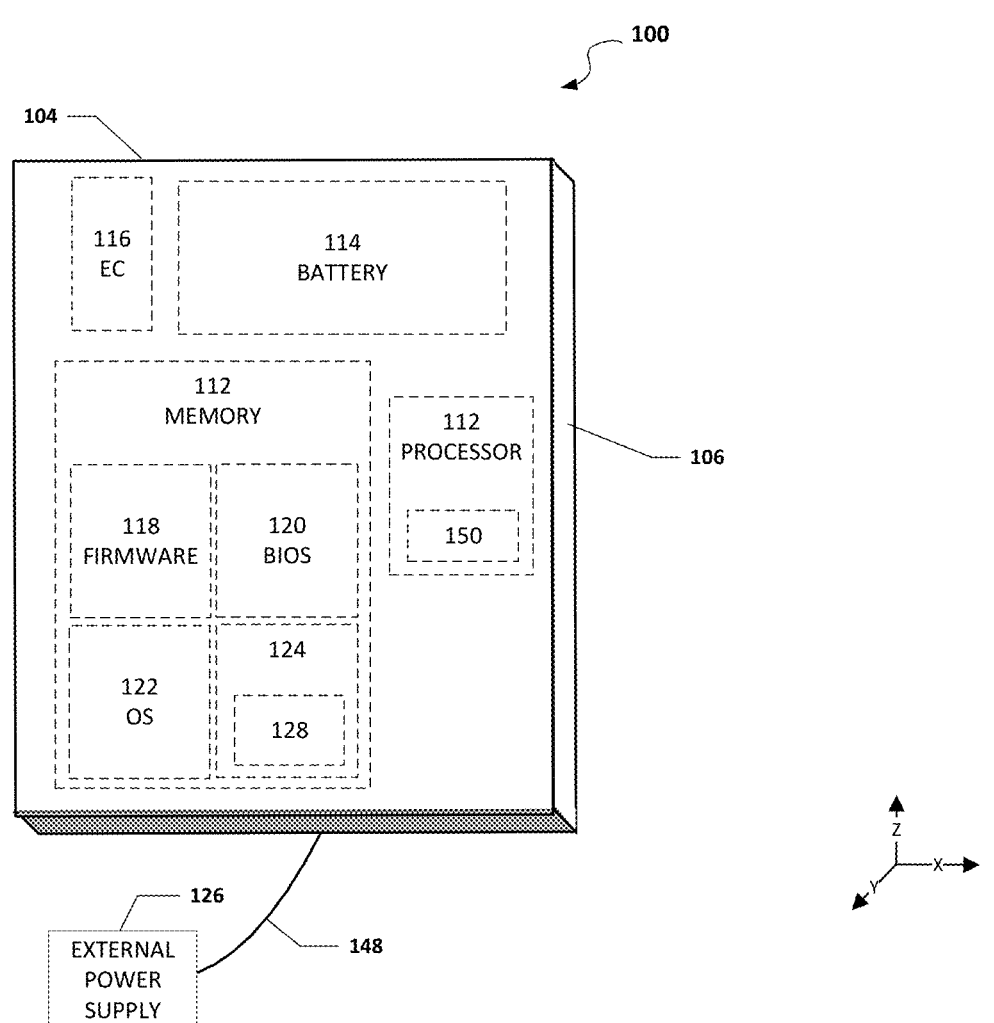

FIGS. 1A-1C are a simplified block diagram of electronic device 100 configured to enable pre-operating system display management, in accordance with an embodiment of the present disclosure. As illustrated in FIG. 1A, electronic device is in an open clamshell configuration. As illustrated in FIG. 1B, electronic device 100 is in an open, flat configuration. As illustrated in FIG. 1C, electronic device 100 is in a table configuration. In an example, an electronic device 100 can include a first housing 102 and a second housing 104. The first housing 102 can be pivotably or rotatably coupled to the second housing 104 using a hinge 106. The first housing 102 can include a display 108.

The second housing 104 can include memory 110, one or more processors 112, an internal power source 114, and an embedded controller (EC) 116. One or more of memory 110, the one or more processors 112, the internal power source 114, and the EC 116 can be located in the first housing 102 and/or the second housing 104. For, example, as illustrated in FIG. 1A, memory 110, the one or more processors 112, the internal power source 114, and the EC 116 are located in the second housing 104. However, one or more of memory 110, the one or more processors 112, the internal power source 114, and/or the EC 116 may be located in the first housing 102.

Memory 110 can include firmware 118, BIOS 120, operating system (OS) 122, and a shared EC/BIOS memory 124. The one or more processors 112 include a central processing unit (CPU) 150. The internal power source 114 may be a battery or some other type of power source for electronic device 100. The internal power source 114 can power the electronic device 100. The electronic device 100 can also be powered by an external power supply 126. The external power supply 126 can be a wall socket, AC power supply, or some other external power source. The charging connection 148 from the external power supply 126 to the electronic device 100 may be a USB cable or power cord. In some examples, the charging connection 148 may have a limited power capacity (e.g., limited to 15 watts). As illustrated in FIGS. 1B and 1C, the shared EC/BIOS memory 124 can include a low/critical battery indicator 128.

When the electronic device 100 boots up (e.g., a start button is pressed), the EC 116 determines the status of the internal power source 114. For example, if the internal power source 114 is a battery, the EC 116 can determine a battery condition. The term "battery condition" includes the power level of the battery (or level of the battery), the state of the battery, the capacity of the battery, and other indicators that can help determine the level of charge of the battery (e.g., if the battery is dead, almost dead, fully charged, etc.). If the EC 116 determines that the condition of the internal power source 114 is at a low level, (e.g., in a low power or critical state), the EC 116 can pass the information to the BIOS 120. In a specific example, the EC 116 can use the shared EC/BIOS memory 124 or EC sharable memory to set an indicator 128 that the BIOS 120 can read and determine if the condition of the internal power source 114 is at a low level and in a low power state (e.g., a capacity level of the battery is four percent or less). When the BIOS 120 reads the shared EC/BIOS memory 124 and determines that the indicator 128 has been set by the EC 116, the BIOS 120 can determine that the display 108 should not be initialized at full brightness. Instead, the BIOS 120 can determine that the display brightness for the display 108 should be set to a lower display brightness to conserve power rather than a maximum brightness or the brightness according to a video BIOS table (VBT).

The EC 116 can determine the status of the internal power source 114 during a pre-OS stage (described below) and before a CPU reset (e.g., when the CPU 150 is reset during the boot process). The term "pre-OS stage" includes one or more stages of the boot process (described below) that occurs before the OS stage and includes the CPU reset. The term "pre-CPU reset stage" includes when the system is powered on (e.g., the power button is pressed) to when the CPU 150 starts to execute the BIOS. During the pre-CPU reset stage, hardware sequencing occurs where the system power and clock stabilization takes place and other microcontrollers (e.g., EC, Converged Security Engine (CSE), Power Management Controller (PMC), PUNIT, etc.) are executed before the CPU reset.

After the CPU 150 is reset, the CPU 150 begins to execute the first instructions from the BIOS 120, the premem stage and MRC initialization are completed, the BIOS 120 powers up the display 108, and the display 108 can begin to display pixels. While the display 108 is powered up, the system continues with the boot process, OS 122 is executed, and the OS boot can be completed. In some examples, the internal power source 114 of the electronic device may be low and/or power may need to be conserved. The system can be configured to include a dynamic backlight controller that uses a power policy at the pre-OS stage to save power.

Typically, when a device is turned on and starts to boot up, a wide array of processes and tasks occur before a user interface appears on the display. This routine is commonly referred to as the device boot-up process or "booting" and is critical to ensure that the device functions as efficiently as possible. The terms "boot up," "booting up," "booting," the "boot process," or the "boot-up process," are all generally understood as the initialization of a computerized system or device.

A bootloader is logic that is responsible for booting a device. When a device is turned off, its logic, including the OS, application code, and data, remains stored on non-volatile memory. When the device is powered on, the device typically does not have an OS or its loader in random-access memory (RAM). The device first executes a relatively small program, the bootloader, stored in read-only memory (ROM), erasable programmable read-only memory (EPROM), electrically erasable programmable read-only memory (EEPROM), flash memory (e.g., NOR flash), or some other type of non-volatile memory. The bootloader initializes the RAM to access the nonvolatile device (usually a block device, (e.g., NAND flash), or other devices from which the OS programs and data can be loaded into the RAM. The bootloader is a type of firmware.

Firmware is a specific class of computer logic that provides the low-level control for a device's specific hardware. Firmware, such as the BIOS of a personal computer, may contain only elementary basic functions and may only provide services to higher-level software. Unlike most modern OSs, firmware rarely has a well-evolved automatic mechanism of updating itself. Firmware is held in non-volatile memory devices such as ROM, EPROM, EEPROM, and flash memory. Updating the firmware requires ROM integrated circuits to be physically replaced, or EPROM or flash memory to be reprogrammed through a special procedure. Some firmware memory devices are permanently installed and cannot be changed after manufacture. Although it is possible to break down the boot-up process using a highly detailed analytical methodology, many consider the boot-up process to consist of five significant stages. The five stages are the power on stage (that includes the pre-CPU reset stages), the load BIOS stage, the power-on self-test (POST) stage, the OS load stage, and the transfer of control to the OS stage (the "OS stage"). The power on stage is the only stage that is actively initiated by the user. At this stage, the user powers on the device (e.g., by pressing a power button) and power is supplied to the internal hardware of the device. When the power reaches the CPU, the bootloader logic inside the read-only memory (ROM) is executed, and the boot-up process is started. The instructions inside the ROM, are executed immediately following the power-on stage and is part of a series of fundamental routines that lay the framework for the POST stage.

The POST is a specific routine handled exclusively by the system BIOS and is initiated after the BIOS stage. The POST stage is designed to ensure that all the internal hardware in the device is fully operational and capable of continuing the boot-up sequence. During the POST stage, various elements of the device, such as the hard drive and memory, are checked for any apparent errors or problems. In the event that a problem is found, the boot process stalls. If no problems are discovered, the device begins to activate various hardware inside the device in the order listed as part of the boot-order list. During the POST stage, each device included on the boot list loads its own unique BIOS. During this process, the hardware being booted communicates directly with the motherboard and provides all the information needed to ensure that it can receive and transmit messages to other connected hardware and to the motherboard itself.

The BIOS can be thought of as paving roads between various destinations within the device. Without these roads, the motherboard could not effectively manage the diverse array of hardware included inside the device. The BIOS acts as a fundamental getting-to-know-you process between peripheral devices and the motherboard. After the BIOS stage is completed, the OS load stage starts and the device begins to launch the OS. Once the OS is loaded into RAM, the transfer of control to the OS stage begins and the boot process relinquishes control to the OS. The OS then proceeds to execute any pre-configured startup routines to define user configurations or application executions. At the end of the handoff, the electronic device is ready for use.

Generally speaking, an OS can be defined as an integrated software application that provides a platform for the electronic device's most fundamental and basic functions. These are tasks that must often occur following a request from the user, such as launching an application or accessing the functionality stored in peripheral hardware. To ensure that the OS runs successfully, it first loads into the electronic device's RAM. The BIOS is responsible for transferring the OS into the electronic device's RAM. After the OS is successfully loaded and evaluated to ensure full compliance with onboard hardware, full control of the electronic device is transferred to the OS as part of the final stage of the boot process. At this point, the OS begins to launch any specific applications that the OS relies on to successfully function.

It is to be understood that other embodiments may be utilized and structural changes may be made without departing from the scope of the present disclosure. Substantial flexibility is provided in that any suitable arrangements and configuration may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

For purposes of illustrating certain example techniques of an electronic device configured to enable pre-operating system display management, the following foundational information may be viewed as a basis from which the present disclosure may be properly explained. Generally, a display (e.g., display panel, computer display, computer monitor, monitor, etc.) is an output device that displays information in pictorial form.

Generally, clamshell devices are devices where a first housing is rotatably coupled to a second housing. For example, a clamshell device can be a laptop, notebook computer or other a small, portable personal computer with a clamshell form factor typically having a computer display mounted on the inside of an upper first housing of the clamshell and an alphanumeric keyboard on the inside of a lower second housing of the clamshell. The clamshell device is opened to use the device and folded shut for transportation or storage. While the clamshell device can be plugged into a wall socket, AC power supply, or some other external power source, often the clamshell device is powered by an internal battery. In addition, many portable devices can be powered by an external power source but often relay on the internal battery power. Because the battery has a limited amount of power, power optimization can be critical, especially when the battery is very low or in a critical battery condition.

With modern computing systems, the knowledge of running a power optimized system remains in the OS and the BIOS lacks the means to start a platform while the system is under a critical battery condition. One of the major power consumers in a computing system is the display where firmware (BIOS) attempts to boot a display with the supported default maximum backlight in order to display pre-OS stage user visible data. This can limit the system's capability to boot to the OS in a low power mode where the maximum available power supply is limited due to a weak battery condition and the battery is at a low level or a low power state. In addition, a similar problem occurs when the battery is weak or dead and the device is plug into an external power source and the power supply from the external power source is limited to 15 watts (e.g., if the power supply is a USB-C cable). Another issue is a lack of a method to perform a dynamic backlight control during the pre-OS stage to initialize the display where a verified boot power is unavailable and low battery conditions leads to a bad user experience, an inefficient usage of available system resources, and/or the system is not able to boot to the OS. Also, a firmware and/or OS update initiating at a pre-OS stage with unmanaged/maximum panel backlight power set by BIOS would impact system battery life and eventually can result in an unstable system due to a partial/broken system update.

Displays are one of the most important components of personal computing experience as they provide system sign of life to the user in the form of visual data when being powered on. Liquid Crystal Displays (LCD) are used in most personal computers and other electronic devices like digital camera, touch ID, smart watch, smart home appliances etc. to display information. In a computing system, the display is illuminated by a backlight to increase the visibility of what is being displayed. Due to the fact that the intensity or brightness of a display panel is typically adjusted by an OS Policy Manager (OSPM), backlight power consumption remains unmanaged at one-hundred percent (100%) brightness during pre-OS stages. This can impact battery life, bring instability during a system boot at a low power mode with a dead/weak battery, cause higher battery consumption during a firmware or an OS update and can result in a broken/partial update (e.g., battery goes beyond minimum threshold level for system update typically set at greater than or equal to 50%), and other issues.

Currently, there is no existing solution that addresses the high-power usage of the display, as the firmware during the pre-OS stages must rely on a static backlight configuration from the VBT in the absence of a dynamic backlight policy control mechanism. The VBT provides platform and board specific configuration information and provides a set of display and video-related configurations and functions that are used by programs to access the display and video hardware. Existing solutions do not determine the state of platform while a system is attempting to initialize a display and use a maximum supported panel brightness level that translates to a higher power requirement. In addition, existing solutions lack a mechanism to let the platform boot to the OS with the pre-OS stage display brightness to be dynamically tuned to allow for an efficient boot where user can still see the panel contents under a low-level battery condition.

Due to the fact that the display brightness control is managed by an OS driver, the display brightness control remains unmanaged during pre-OS stages and fixed at a maximum supported brightness by the display panel or statically configured by the BIOS using the VBT until the platform reaches the OS stage. The pre-OS stages involve the entire firmware boot time, (typically one (1) second to 2.5 seconds depending on firmware elapse time) and if there is an update, the time it takes for the firmware or OS update, (typically eight (8) to twenty-five (25) minutes based on the nature of the update) and can lead to inefficient usage of platform power.

Some systems set the backlight brightness to a very low-level during pre-OS stages regardless of the battery condition. However, forcing very low backlight brightness at a pre-OS stage by default could have an impact on the user experience during scenarios like firmware updates, booting to recovery or developer mode, or other scenarios where a user might need to press certain keys to interact with the system based on instructions that appear on a screen of the display. Also, having a pre-set very low backlight brightness during a pre-OS stage may create problems for the user where the low brightness of the display might challenge the user's visual capabilities, especially with users that have reduced visual capabilities.

In some examples, a device may be powered using a USB port. The USB port, which was used primarily for data transfer, has evolved to add a power delivery capability of up to 100 watts. This new capability of a USB port is defined through specification USB Type-C (USB-C) Cable and Connector Specification 1.2 and USB Power Deliver Specification 3.0. USB-C is being used as unified solution where the minimum source advertise for power supply is 15 W (5V/3 A) to start booting the platform and relying on a later boot stage to negotiate for a higher power of up to 100 watts (20V/5 A) (to meet the platform power envelope to boot to OS with all associate features for OS consumption), a protocol negotiation defined by the USB PD specification It is important to note that the high-power negotiation is managed by firmware in the EC firmware and its security policies demand a verified boot process completion before switching to the high power negotiation for platform consumption. This means all the firmware including read/write firmware of the EC needs to be completed and verified before a higher power transition which limits the system's boot to OS with a maximum panel brightness, especially in a scenario where power supply is limited to less than or equal to fifteen (15) watts. In an example of a currently used typical power delivery negotiation flow that can result in potential system instability problem, the peak power requirement for a display (with maximum display supported brightness without any power policy) initialization is higher than the available power supply and bringing the display up is expected to happen prior to higher power negotiation been done during the verified boot process to notify user about "Power Negotiation in Progress" as part of an EC Sync (RO→RW switch). As the backlight control is managed by an OS policy and the firmware boot is typically handled in an unmanaged manner, the maximum display brightness can lead to a bad user experience during weak or dead battery power conditions, where the platform might need more power to display initialization information to the user than the actual available power supply. Due to the fact that the intensity or brightness of a display is typically adjusted by the OS Policy Manager (OSPM), the backlight power consumption remains unmanaged at one-hundred percent (100%) brightness during the pre-OS stages. This can impact battery life, bring instability during the system boot at a low power mode with a dead/weak battery condition, cause higher battery consumption during a firmware or OS update resulting in a broken/partial update (e.g., the battery goes beyond the minimum threshold level for a system update typically set at greater than or equal to 50%), and can cause other issues.

Some users use an electronic device for gaming, graphic arts, high performance usage, etc. and prefer to use two screens. However, using two displays in a portable device can create problems. One issue is with the power usage of having two displays. More specifically, some systems have a second display, for example as a dual display or dual screen device and foldable display devices. With two displays at full brightness during the pre-OS stages, twice the power is used and can cause the same problems as described above. What is needed is a system and method to help enable management of a display or displays during the pre-OS stages.

A system and method to help enable pre-operating system display management or displays in a device can resolve these issues (and others). In an example, before a CPU rest, an EC, (e.g., the EC 116) can determine the status of the device's battery (e.g., the internal power source 114). If the EC determines that the battery condition is in a low power or critical state and the battery level is low, the EC can pass the information to the system's BIOS (e.g., the BIOS 120). In a specific example, the EC can use a shared EC/BIOS memory or EC sharable memory (e.g., the shared EC/BIOS memory 124) to set an indicator (e.g., the indicator 128) that the BIOS can read and determine if the battery condition is in a low power or critical state and the battery level is low. During the BIOS stage, when the BIOS reads the shared EC/BIOS memory and determines that the indicator has been set by the EC, the BIOS can determine that the display should not be initialized at full brightness. Instead, the BIOS can determine that the display brightness for the display should be set to a lower display brightness to conserve power.

In an example, when the system is powered on, a brightness controller present inside the pre-OS stage environment will allow control of the backlight power dynamically in order to boot with USB-C power delivery at a lower battery or weak battery with a fixed fifteen (15) watts of power supply and further to be able to boot until verified boot in USB-C is completed and the system can perform high power negotiation before booting to the OS. The system can dynamically lower the panel backlight power requirement in specific pre-OS stage scenarios like lower power mode, firmware updating, OS updating initiated at the pre-OS stage, S5 charging, running diagnostic tools at the pre-OS stage, etc. and provide additional power for faster charging of the battery by limiting the power to the display by having the brightness of the display set to a lower display brightness rather than at a maximum brightness.

During the pre-OS stages, some current systems enable the display at the maximum supported brightness by reading the LFP maximum brightness level from the BIOS provided by the VBT for panel configuration. The maximum brightness of the display requires higher power leading to system instability and system resources being inefficiently managed. In an example, an EC can detect the boot environmental battery condition to indicate to the platform BIOS to override the static/default backlight policy (e.g., setting the brightness of the display to a maximum brightness). The indicator can be used to by the BIOS to set the display backlight to a power economical configuration at a reduced display power consumption for the user to see visible data at pre-OS stages to minimize the platform power consumption. Once the verified boot can help perform high power negotiation to obtain higher verified power for pre-OS stage initialization, the system can enable the full backlight level for the OS to provide an uncompromised visual experience to the user.

In an illustrative example, some current devices with battery power have a 4K OLED display. In these devices some have USB-C as the power delivery during a low or dead battery condition. However, the devices cannot recover with the low power due to the higher power requirement of the display initializing with maximum backlight power during pre-OS stages display and without a verified boot, the USB-C power delivery cannot negotiate to a higher power to support the full brightness of the display and the other power requirements of the device during the pre-OS stages. The device can overcome this boot limitation by implementing a dynamic backlight control mechanism at pre-OS stages to reduce the brightness of the display and reduce the power requirement of the display as compared to a full brightness display. In addition, the dynamic backlight control method at the pre-OS stage can enable lower backlight power for the display to avoid loading on the power supply and to help prevent power surge issues. With the display consuming less power because of the reduced brightness, power from the adapter can be used for charging the battery faster and allow the system to boot to the OS faster. In an example, the system can reduce the backlight power consumption from 3.5 W to 0.5 W In an illustrative example, where the system is in a dead/weak battery condition, the dynamic backlight control logic at the pre-OS stages can perform display initialization dynamically based on the platform state (e.g., by reading the battery condition using the EC) and can ensure to have a secure verification of the read/write firmware after negotiating for a high power. When the user plugs a USB-C charger into the system, the platform EC boots up and communicates to the USB-C PHY layer on the power advertised by the USB-C charger. The EC reads the battery condition of the platform and determines the battery condition critical or is a dead battery. The EC can update this information in a sharable BIOS-EC memory region to ensure that while booting, the BIOS will not enable the backlight of the display to a full brightness which might need more than fifteen (15) watts and would be above the USB-C power supply as the verified boot to the OS is not completed. The system can active idle with a reduced brightness at the pre-OS stages to allow the system to contribute more power towards the battery and eventually improve the fast charging for the system.

The EC has control of the system well before the platform BIOS takes control and, in an example, the EC can read the battery fuel gauge and determine the capacity of the battery and the battery condition. If the read battery capacity is "Fuel Gauge Buffer" below four percent (4%) and "Display Battery" is less than one percent (1%), the EC can conclude that the system is at a critical low or dead battery condition. If the EC determines that the battery condition is at a critical low or dead battery condition, the EC can set a critical battery flag into EC shared memory location for the BIOS to read after a post CPU reset.

The EC can configure the platform to power the SoC directly with power from a USB-C connection. The maximum power supply available at this stage is fifteen (15) watts. After the CPU hits reset, the BIOS can continue booting and perform the basic chipset initialization and DRAM initialization prior to bring up the display. Boot firmware/BIOS can determine the power state by reading the critical battery flag from the EC shared memory region. If the flag is set, then the BIOS will be able to determine that the platform is at a critical power state where a maximum fifteen (15) watts of power supply is available over the USB-C connection. A display initialization module inside the BIOS can perform the display initialization in a manner with the least available backlight control which would help to avoid about four (4) to about five (5) watts of extra power requirement at the pre-OS stages. Prior to handle the backlight control, the display initialization module can check the display backlight technology field from the VBT field. If the display is an LCD/LED display, the BIOS will override its default policy of reading default/static "Brightness level" from the VBT that would result in the maximum brightness of the display. The override can change the level to a lower brightness to try and reduce the power consumption of the display.

If the display is an OLED display, the BIOS won't directly set the maximum duty cycle supported by panel to qualify as 100% brightness. On the contrary, the OLED has self-lightening pixels meaning its pixels can produce the light without the need of backlight unit as an LCD panel does. Also, OLED panels can provide a better viewing angel due to its self-lighting pixels which ensures pure black without any backlight.

In order to ensure that BIOS doesn't compromise with end user pre-OS stage display experiences (e.g., a developer and recovery mode where the pre-OS stage display is key), the display may have a minimum brightness that does not affect, or greatly affect, the user's ability to interact with a user interface on the display. In a specific example, for LCD/LED backlight control, the minimum brightness control value can be obtained from the "LFP Minimum Brightness level table 2" VBT field. More specifically, bit 15:0 can provide the minimum brightness level. To ensure the minimum brightness value in the "LFP Minimum Brightness level table 2" is not same as the maximum brightness level in the "LFP Brightness Level Table 2," the two values can be compared to each other. If the minimum brightness value in the "LFP Minimum Brightness level table 2" is not the same as the maximum brightness level in the "LFP Minimum Brightness level table 2", the minimum brightness level can be used to set the backlight power control and brightness level for pre-OS stage data. If the minimum brightness value in the "LFP Minimum Brightness level table 2" is the same as the maximum brightness level in the "LFP Minimum Brightness level table 2" a value of "6," or some other value, can be is used as a minimum guaranteed brightness level in case the minimum brightness field in the VBT has been wrongly configured. The below table can be used to configure the backlight duty cycle based on the battery power state to ensure the panel has optimum brightness being set.

| Battery % | Duty Cycle for Backlight in % |
|---|---|
| 0~2% | 10 |
| 3~9% | 20 |
| 10~50% | 50 |
| >50% | 100 |

For an OLED display, the BIOS should perform the display initialization with a negative contrast polarity. This way, the OLED display power consumption can be only limited to its fonts alone which emit the light and the rest of the screen background on the display will remain as black pixels or off pixels, to save more power.

The reduced brightness of the display can allow the system to continue booting in with a limited fifteen (15) watts of power from the USB-C power supply without any of the system instability issues described above. In addition, the boot firmware can perform a verification of read/write firmware of the EC to negotiate a higher power using USB-PD. After successful negotiation, the boot firmware can allow the platform to bring the system to a post critical stage where the system can scale the power supply up to one-hundred (100) watts and allow the battery to consume the power supply by triggering the charge mode. The system can either decide to restore back the backlight control as per OEM display configuration data part of the VBT for LCD or restore the display to a positive contrast polarity for OLED. After booting to the OS, the OS display driver and the power policy may keep the same backlight control or modify the backlight control based on the user's preference and system requirements.

USB Power Delivery (PD) is a single-wire protocol leveraging USB Type-C standards and cables. With USB PD, USB Type-C ports can be either a source, a sink, or both a source and a sink. USB PD negotiation lets the device create a contract to deliver the power level for each application. This protocol expands the USB protocol to deliver up to 100 W (20 V, 5 A) of power. Data role capabilities are also enhanced as the USB PD protocol is used to negotiate data and video capabilities and direction. The PD firmware is part of EC's firmware and therefore needs to jump to the read/write section successfully to be negotiated to the higher power.

In order to make the BIOS informative and efficient to make a decision on its own to influence the pre-OS stage power optimization, the BIOS needs to have a learning feed from the OS layer to the BIOS layer. To make this decision and allow for the communication process between the OS layer and the BIOS layer and vice versa, the system needs to make use of some hardware-based memory. In a specific illustrative example, RTC/CMOS upper memory bank (128 bits) can be used to create a data structure that should remain available across the boot cycle and also persist until the OS takes over. At the boot stage, the BIOS will first time allocate an INFORMATIVE_OPTIMIZATION_TABLE structure into the RTC memory. The table signature can be initialized as "FEEDCODE". During consecutive boot phases, the BIOS will read this memory region to check if the signature is valid. Upon verification that the signature is valid, the BIOS will check if any informative entry has already been made by reading the "FW_Update" data variable. Based on the informative tasks bit definition, during a firmware update and/or an OS update or OS splash screen, the BIOS will either inverse the contrast polarity of the pre-OS stage screen or the BIOS will reduce the LCD backlight controller power to make the firmware update and/or an OS update or OS splash screen more power efficient.

Forcing very low backlight brightness at pre-OS stages by default would have an impact on the user experience during scenarios like firmware update, booting to recovery, developer mode, etc. where the user might need to press certain keys to interact with system based on instructions that appear on screen of the display during pre-OS stages. If the display was defaulted to a very low display brightness at the pre-OS stage, the very low display brightness might challenge a user's visual capabilities. From a power consumption perspective, the display brightness level should be managed at a point where the user can still see the display user interface contents but not too low so as to not impact user behavior as in the example of a firmware update and other interactive use cases that do not initiate during critical boot scenarios. Managing the dynamic backlight control during a critical boot phase can increase the boot time, however, the increase is boot time is relatively small (e.g., by an additional 10 ms at maximum).

In an example implementation, electronic device 100 is meant to encompass an electronic device that includes multiple displays, especially a computer, laptop, electronic notebook, hand held device, wearables, network elements that have multiple displays, or any other device, component, element, or object that has multiple displays. Electronic device 100 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic device 100 may include virtual elements.

Electronic device 100 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic device 100 may include virtual elements.

In regards to the internal structure associated with electronic device 100, electronic device 100 can include memory elements for storing information to be used in the operations outlined herein. Electronic device 100 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in electronic device 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, elements of electronic device 100 may include software modules to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic device 100 may include one or more processors that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

Figure 2:
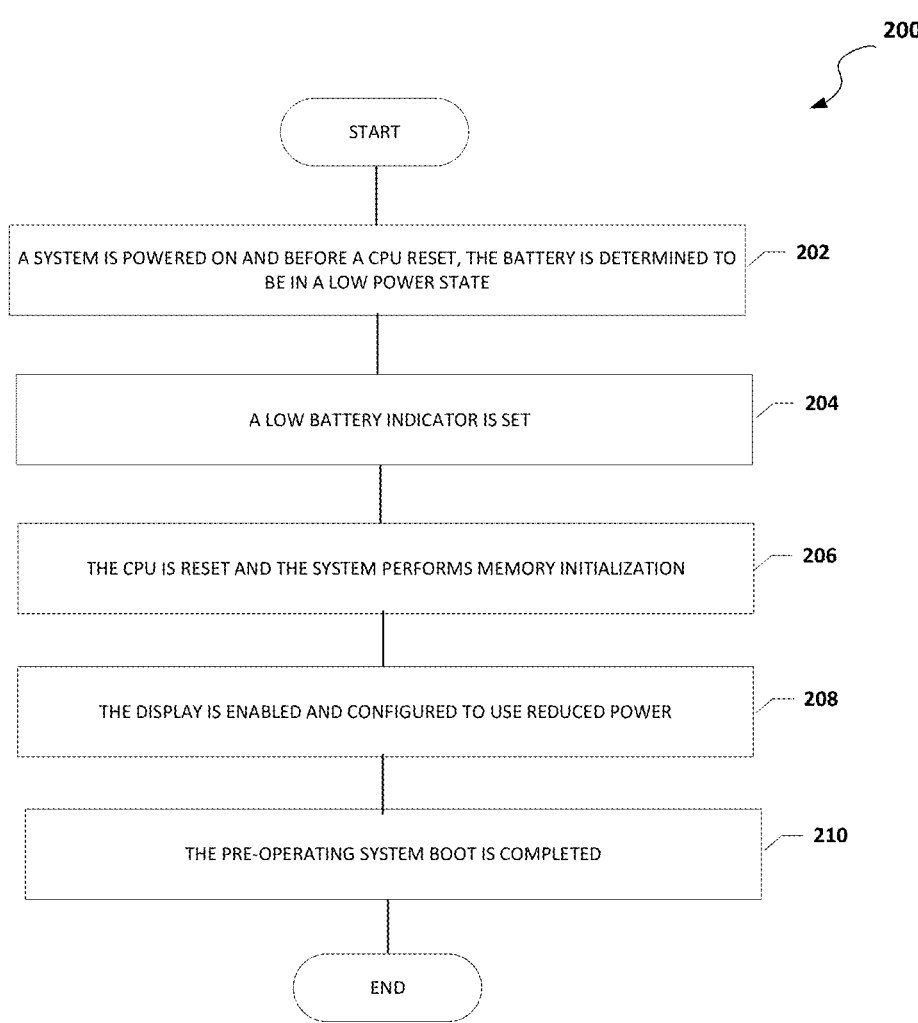
FIG. 2 is a simplified flowchart illustrating potential operations that may be associated with the system in accordance with an embodiment of the present disclosure.

Turning to FIG. 2, FIG. 2 is an example flowchart illustrating possible operations of a flow 200 that may be associated with enabling pre-operating system display management, in accordance with an embodiment. In an embodiment, one or more operations of flow 200 may be performed by EC 116, firmware 118, BIOS 120, OS 122, and shared EC/BIOS memory 124. At 202, a system for an electronic device is powered on and before a CPU reset, the battery is determined to be in a low power state (e.g., a capacity level of the battery is four percent or less). At 204, a low battery indicator is set. For example, the low battery indicator may be set by the EC 116. At 206, the CPU is reset and the system performs memory initialization. At 208, the display is enabled and configured to use reduced power. For example, a brightness of the display can be set to a lower brightness of the display as compared to a native brightness of the display, the brightness level from a VBT table, or a maximum brightness. At 210, the pre-OS boot is completed and the OS stage can start. For example, the OS stage can start and the device can begin to launch the OS. Once the OS is loaded into RAM, the transfer of control to the OS stage begins and the boot process relinquishes control to the OS.

Turning to FIG. 3, FIG. 3 is an example flowchart illustrating possible operations of a flow 300 that may be associated with enabling pre-operating system display management, in accordance with an embodiment. In an embodiment, one or more operations of flow 300 may be performed by EC 116, firmware 118, BIOS 120, OS 122, and shared EC/BIOS memory 124. At 302, a system for an electronic device is powered on and before a CPU reset, an EC determines the battery condition or the state of the battery. At 304, the system determines if the battery is in a low power state (a capacity level of the battery is four percent or less). If the battery is not in a low power state, then the system will boot without restrictions, as in 306. If the battery is in a low power state, then the EC sets a low battery indicator in a shared EC/BIOS memory region, as in 308. At 310, the CPU is reset and the system performs memory initialization. At 312, during the post memory stage, the BIOS reads the shared EC/BIOS memory region and determines that the low battery indicator is set. At 314, the display is enabled and is configured to use a reduced power. For example, a brightness of the display can be set to a lower brightness of the display as compared to a native brightness of the display, the brightness level from a VBT table, or a maximum brightness. At 316, the pre-OS boot is completed and the OS stage can start. For example, the OS stage can start and the device can begin to launch the OS. Once the OS is loaded into RAM, the transfer of control to the OS stage begins and the boot process relinquishes control to the OS.

Figure 4:
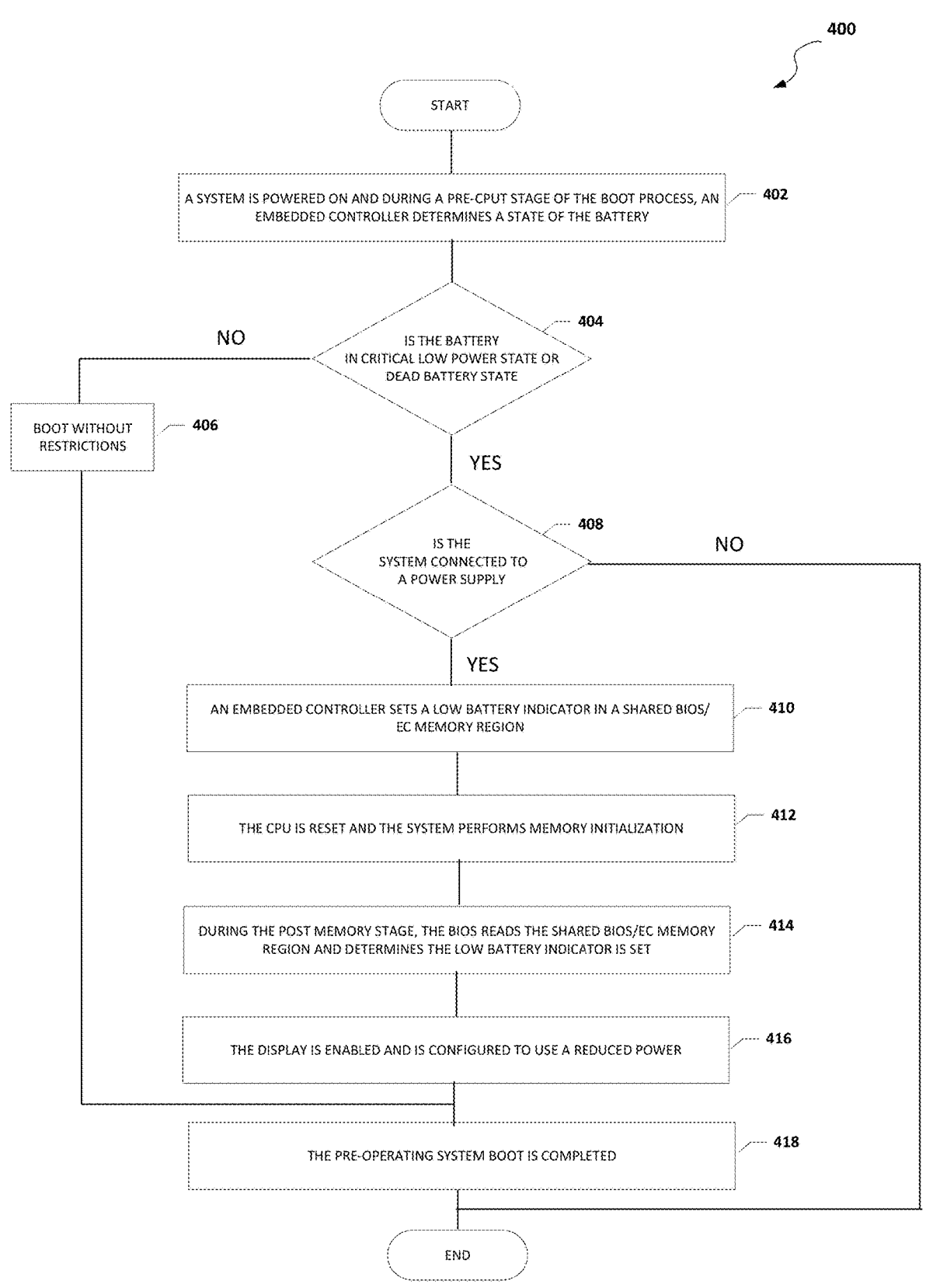
FIG. 4 is a simplified flowchart illustrating potential operations that may be associated with the system in accordance with an embodiment of the present disclosure.

Turning to FIG. 4, FIG. 4 is an example flowchart illustrating possible operations of a flow 400 that may be associated with enabling pre-operating system display management, in accordance with an embodiment. In an embodiment, one or more operations of flow 400 may be performed by EC 116, firmware 118, BIOS 120, OS 122, and shared EC/BIOS memory 124. At 402, a system is powered on and during the pre-CPU reset stage of the boot up process, an EC determines the state of the battery. At 404, the system determines if the battery is in a critically low power state (e.g., a capacity level of the battery is four percent or less) or dead battery state. If the battery is not in a critically low power state or dead battery state, then the system will boot without restrictions, as in 406. If the battery is in a critically low power state or a dead battery state, then the system determines if the system is connected to a power supply, as in 408. If the system is not connected to a power supply, then the process ends because there will not be enough power to boot the system.

If the system is connected to a power supply, then the EC sets a low battery indicator in a shared EC/BIOS memory region, as in 410. At 412, the CPU is reset and the system performs memory initialization. At 414, during the post memory stage, the BIOS reads the shared EC/BIOS memory region and determines that the low battery indicator is set. At 416, the display is enabled and is configured to use a reduced power. For example, a brightness of the display can be set to a lower brightness of the display as compared to a native brightness of the display, the brightness level from a VBT table, or a maximum brightness. At 418, the pre-OS boot is completed and the OS stage can start. For example, the OS stage can start and the device can begin to launch the OS. Once the OS is loaded into RAM, the transfer of control to the OS stage begins and the boot process relinquishes control to the OS.

Figure 5:
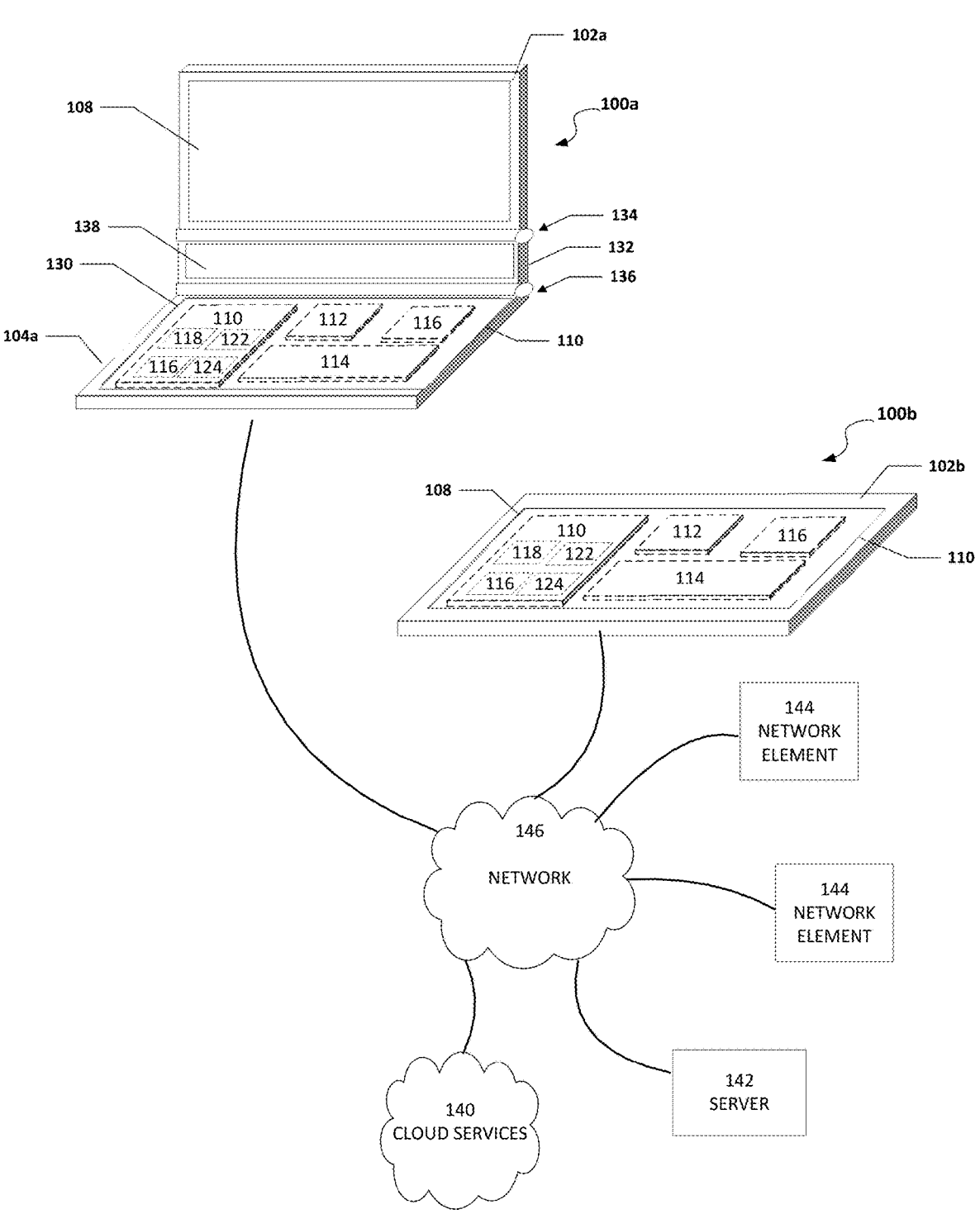
FIG. 5 is a simplified block diagram of an electronic device that includes a system to enable pre-operating system display management, in accordance with an embodiment of the present disclosure.

Turning to FIG. 5, FIG. 5 is a simplified block diagram of an electronic device 100a configured to enable pre-operating system display management and an electronic device 100b configured to enable pre-operating system display management, in accordance with an embodiment of the present disclosure. In an example, electronic device 100a can include the first housing 102a, the second housing 104, and a third housing 132. The first housing 102a can be pivotably or rotatably coupled to third housing 132 using a first hinge 134. Third housing 132 can be pivotably or rotatably coupled to the second housing 104 using a second hinge 136. The first housing 102a can include the display 108. The second housing 104 can include a second display 130. The third housing 132 can include a third display 138. Electronic device 100a can also include memory 110, the one or more processors 112, the internal power source 114, and the EC 116. The memory 110 can include the firmware 118, the BIOS 120, the OS 122, and the shared EC/BIOS memory 124. Electronic device 100a can be powered by the external power supply 126 (not shown) and the charging connection 148 (not shown).

In an example, electronic device 100b may only include a first housing 102b. For example, electronic device 100b may be a tablet, smartphone, wearable, or some other portable device. The first housing 102b can include the display 108, memory 110, the one or more processors 112, the internal power source 114, and the EC 116. The memory 110 can include the firmware 118, the BIOS 120, the OS 122, and the shared EC/BIOS memory 124. Electronic device 100b can be powered by the external power supply 126 (not shown) and the charging connection 148 (not shown).

Electronic device 100a and 100b (and electronic device 100) may each be a standalone device or in communication with cloud services 140, one or more servers 142 and/or one or more network elements 144 using network 146. Network 143 represents a series of points or nodes of interconnected communication paths for receiving and transmitting packets of information. Network 146 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In network 146, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

Figure 6:
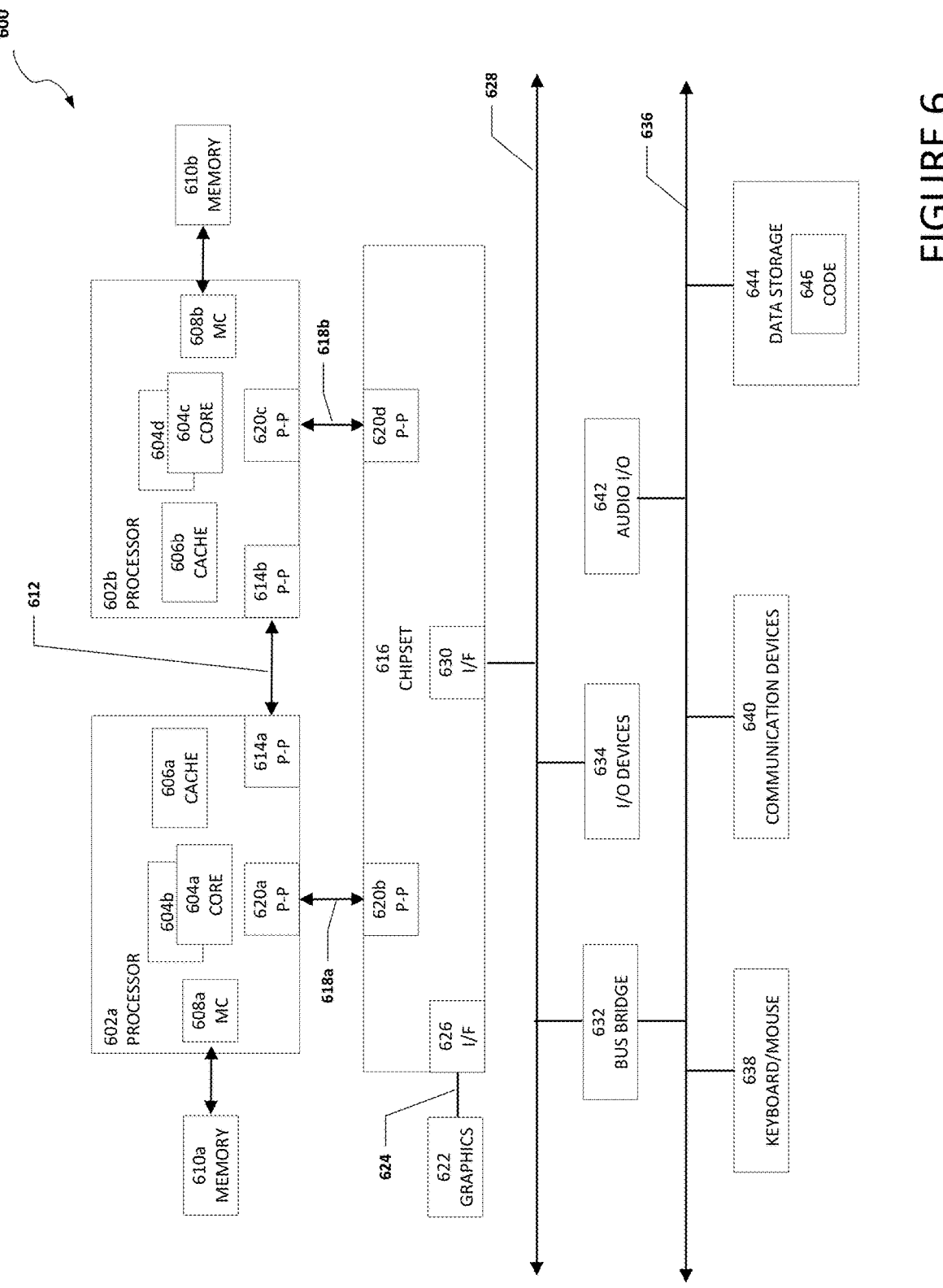
FIG. 6 is a block diagram illustrating an example computing system that is arranged in a point-to-point configuration in accordance with an embodiment.

Turning to FIG. 6, FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, one or more of the elements of the electronic devices 100, 100a, and 110b may be configured in the same or similar manner as computing system 600.

As illustrated in FIG. 6, system 600 may include several processors, of which only two, processors 602a and 602b, are shown for clarity. While two processors 602a and 602b are shown, it is to be understood that an embodiment of system 600 may also include only one such processor. Processors 602a and 602b may each include a set of cores (i.e., processors cores 604a and 604b and processors cores 604c and 604d) to execute multiple threads of a program. The cores may be configured to execute instruction code in a manner similar to that discussed above with reference to FIGS. 1-4. Each processor 602a and 602b may include at least one shared cache 606a and 606b respectively. Shared caches 606a and 606b may each store data (e.g., instructions) that are utilized by one or more components of processors 602a and 602b, such as processor cores 604a and 604b of processor 602a and processor cores 604c and 604d of processor 602b.

Processors 602a and 602b may also each include integrated memory controller logic (MC) 608a and 608b respectively to communicate with memory elements 610a and 610b. Memory elements 610a and/or 610b may store various data used by processors 602a and 602b. In alternative embodiments, memory controller logic 608a and 608b may be discrete logic separate from processors 602a and 602b.

Processors 602a and 602b may be any type of processor and may exchange data via a point-to-point (PtP) interface

612 using point-to-point interface circuits 614a and 614b respectively. Processors 602a and 602b may each exchange data with a chipset 616 via individual point-to-point interfaces 618a and 618b using point-to-point interface circuits 620a-620d. Chipset 616 may also exchange data with a high-performance graphics circuit 622 via a high-performance graphics interface 624, using an interface circuit 626, which could be a PtP interface circuit. In alternative embodiments, any or all of the PtP links illustrated in FIG. 6 could be implemented as a multi-drop bus rather than a PtP link.

Chipset 616 may be in communication with a bus 628 via an interface circuit 630. Bus 628 may have one or more devices that communicate over it, such as a bus bridge 632 and I/O devices 634. Via a bus 636, bus bridge 632 may be in communication with other devices such as a keyboard/mouse 638 (or other input devices such as a touch screen, trackball, etc.), communication devices 640 (such as modems, network interface devices, or other types of communication devices that may communicate through a network), audio I/O devices 642, and/or a data storage device 644. Data storage device 644 may store code 646, which may be executed by processors 602a and/or 602b. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 7:
FIG. 7 is a simplified block diagram associated with an example ARM ecosystem system on chip (SOC) of the present disclosure.

Turning to FIG. 7, FIG. 7 is a simplified block diagram associated with an example ecosystem SOC 700 of the present disclosure. At least one example implementation of the present disclosure can include the device pairing in a local network features discussed herein and an ARM component. For example, the example of FIG. 7 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 7, ecosystem SOC 700 may include multiple cores 702a and 702b, an L2 cache control 704, a graphics processing unit (GPU) 706, a video codec 708, a liquid crystal display (LCD) I/F 710 and an interconnect 712. L2 cache control 704 can include a bus interface unit 714, a L2 cache 716. Liquid crystal display (LCD) I/F 710 may be associated with mobile industry processor interface (MIPI)/high-definition multimedia interface (HDMI) links that couple to an LCD.

Ecosystem SOC 700 may also include a subscriber identity module (SIM) I/F 718, a boot read-only memory (ROM) 720, a synchronous dynamic random-access memory (SDRAM) controller 722, a flash controller 724, a serial peripheral interface (SPI) master 728, a suitable power control 730, a dynamic RAM (DRAM) 732, and flash 734. In addition, one or more embodiments include one or more communication capabilities, interfaces, and features such as instances of Bluetooth™ 736, a 3G modem 738, a global positioning system (GPS) 740, and an 802.11 Wi-Fi 742.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
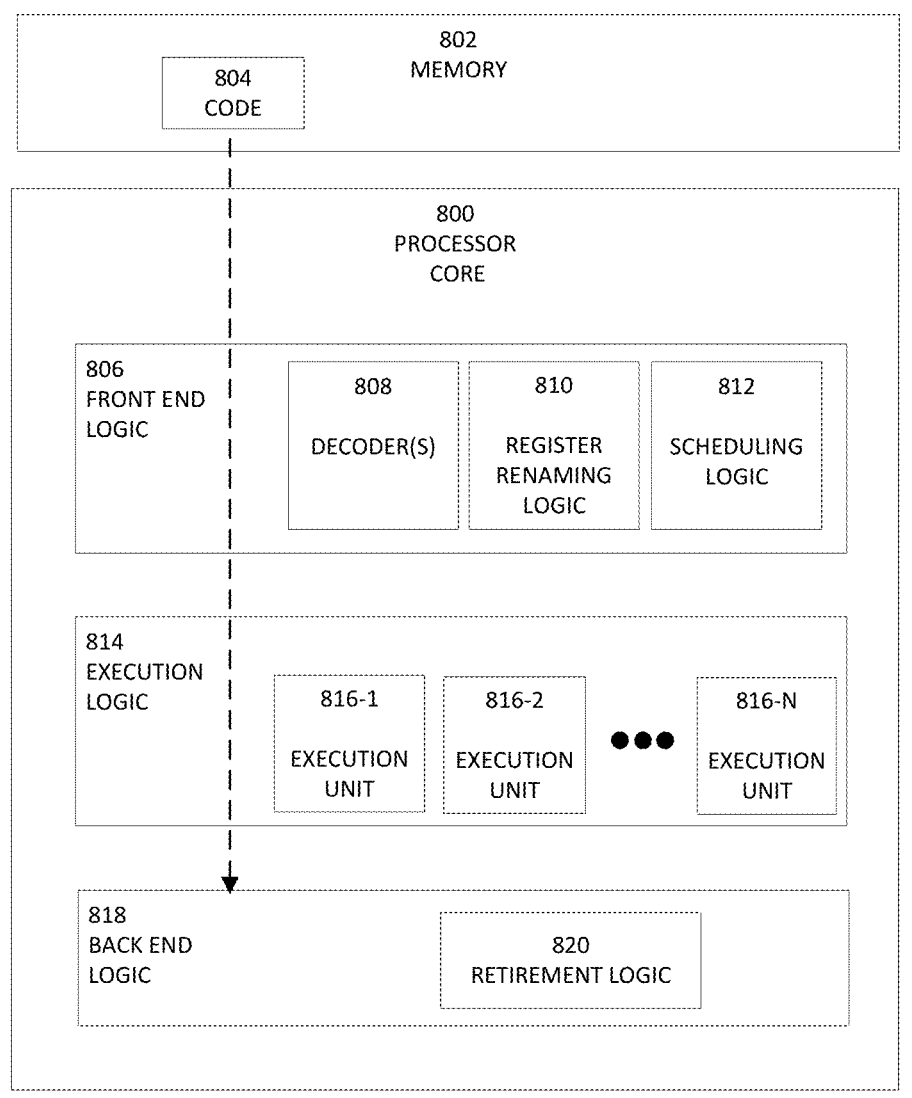
FIG. 8 is a block diagram illustrating an example processor core in accordance with an embodiment.

Turning to FIG. 8, FIG. 8 illustrates a processor core 800 according to an embodiment. Processor core 800 may be the core for any type of processor, such as a micro-processor, an embedded processor, a digital signal processor (DSP), a network processor, or other device to execute code. Although only one processor core 800 is illustrated in FIG. 8, a processor may alternatively include more than one of the processor core 800 illustrated in FIG. 8. For example, processor core 800 represents one example embodiment of processors cores 604a-604d shown and described with reference to processors 602a and 602b of FIG. 6. Processor core 800 may be a single-threaded core or, for at least one embodiment, processor core 800 may be multithreaded in that it may include more than one hardware thread context (or "logical processor") per core.

FIG. 8 also illustrates a memory 802 coupled to processor core 800 in accordance with an embodiment. Memory 802 may be any of a wide variety of memories (including various layers of memory hierarchy) as are known or otherwise available to those of skill in the art. Memory 802 may include code 804, which may be one or more instructions, to be executed by processor core 800. Processor core 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor core 800 can also include execution logic 814 having a set of execution units 816-1 through 816-N. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor core 800 allows out of order execution but requires in order retirement of instructions. Retirement logic 820 may take a variety of known forms (e.g., re-order buffers or the like). In this manner, processor core 800 is transformed during execution of code 804, at least in terms of the output generated by the decoder, hardware registers and tables utilized by register renaming logic 810, and any registers (not shown) modified by execution logic 814.

Although not illustrated in FIG. 8, a processor may include other elements on a chip with processor core 800, at least some of which were shown and described herein with reference to FIG. 6. For example, as shown in FIG. 6, a processor may include memory control logic along with processor core 800. The processor may include I/O control logic and/or may include I/O control logic integrated with memory control logic.

It is also important to note that the operations in the preceding diagrams (e.g., FIGS. 2-4) illustrates only some of the possible scenarios and patterns that may be executed by, or within, electronic devices 100, 100*a*, and 100*b*. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by electronic devices 100, 100*a*, and 100*b* in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although electronic devices 100, 100*a*, and 100*b* have been illustrated with reference to particular elements and operations, these elements and operations may be replaced by any suitable architecture, protocols, and/or processes that achieve the intended functionality of electronic devices 100, 100*a*, and 100*b*.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

In Example A1, an electronic device can include a battery, a display, an embedded controller to determine a battery condition of the battery and set an indicator when the battery condition is in a low power state, and a basic input/output system (BIOS), wherein, before an operating system stage of a boot process, the BIOS sets a brightness of the display at a native brightness if the indicator is not set and sets the brightness of the display at a low power brightness to reduce the brightness of the display if the indicator is set.

In Example A2, the subject matter of Example A1 can optionally include where the indicator is set before memory initialization during the boot process.

In Example A3, the subject matter of any one of Examples A1-A2 can optionally include where the electronic device is connected to an external power source using a USB-C cable.

In Example A4, the subject matter of any one of Examples A1-A3 can optionally include where the USB-C cable supplies fifteen watts of power or less during a boot up process.

In Example A5, the subject matter of any one of Examples A1-A4 can optionally include where the display is a liquid crystal display and the brightness is reduced by reducing a backlight.

In Example A6, the subject matter of any one of Examples A1-A5 can optionally include where the display is an OLED display and the brightness is reduced by initializing the display with a negative contrast polarity.

In Example A7, the subject matter of any one of Examples A1-A6 can optionally include where the indicator is also set if the electronic device is updating firmware or an operating system.

In Example A8, the subject matter of any one of Examples A1-A7 can optionally include where the battery condition is at a low power state when a capacity level of the battery is four percent less.

Example M1 is a method including determining that an electronic device with a display is powered on using a battery, starting a boot process for the electronic device, determining a battery condition of the battery, setting an indicator before memory initialization during the boot process if the battery condition is at a low power state, setting a brightness of the display to a native brightness if the indicator is not set, and setting the brightness of the display to a low power brightness to reduce the brightness of the display if the indicator is set.

In Example M2, the subject matter of Example M1 can optionally include where an embedded controller determines the battery condition before a central processing unit of the electronic device is reset.

In Example M3, the subject matter of any one of the Examples M1-M2 can optionally include where a basic input/output system (BIOS) causes the brightness of the display to be set to a low power brightness if the indicator is set.

In Example M4, the subject matter of any one of the Examples M1-M3 can optionally include where the brightness of the display is set before an operating system stage of the boot process.

In Example M5, the subject matter of any one of the Examples M1-M4 can optionally include where the display is liquid crystal display and the brightness is reduced by reducing a backlight.

In Example, M6, the subject matter of any one of the Examples M1-M5 can optionally include where the display is an OLED display and the brightness is reduced by initializing the display with a negative contrast polarity.

Example S1 is a system for enabling for enabling pre-operating system display management in an electronic device. The system can include a battery, a display, one or more processors, and one or more instructions that, when executed by the one or more processors, cause the one or more processors to determine a battery condition and set an indicator when then battery condition is at a low power state before memory initialization during a boot process, and set a brightness of display at a native brightness if the indicator is not set and set the brightness of the display at a low power brightness to reduce the brightness of the display if the indicator is set.

In Example S2, the subject matter of Example S1 can optionally include an embedded controller to determine the battery condition before a central processing unit is reset during the boot process.

In Example S3, the subject matter of any one of the Examples S1-S2 can optionally include a basic input/output system (BIOS) to set the brightness of the display before an operating system stage of the boot process.

In Example S4, the subject matter of any one of the Examples S1-S3 can optionally include where the display is a liquid crystal display and the brightness is reduced by reducing a backlight.

In Example S5, the subject matter of any one of the Examples S1-S4 can optionally include where the display is an OLED display and the brightness is reduced by initializing the display with a negative contrast polarity.

In Example S6, the subject matter of any one of the Examples S1-S5 can optionally include where the system is connected to an external power source using a USB-C cable and the USB-C cable supplies fifteen watts of power or less during the boot process.

Example AA1 is an apparatus including means for determining that an electronic device with a display is powered on using a battery, means for starting a boot process for the electronic device, means for determining a battery condition of the battery, means for setting an indicator before memory initialization during the boot process if the battery condition is at a low power state, means for setting a brightness of the display to a native brightness if the indicator is not set, and means for setting the brightness of the display to a low power brightness to reduce the brightness of the display if the indicator is set.

In Example AA2, the subject matter of Example AA1 can optionally include where an embedded controller determines the battery condition before a central processing unit of the electronic device is reset.

In Example AA3, the subject matter of any one of Examples AA1-AA2 can optionally include where a basic input/output system (BIOS) causes the brightness of the display to be set to a low power brightness if the indicator is set.

In Example AA4, the subject matter of any one of Examples AA1-AA3 can optionally include where the brightness of the display is set before an operating system stage of the boot process.

In Example AA5, the subject matter of any one of Examples AA1-AA4 can optionally include where the display is liquid crystal display and the brightness is reduced by reducing a backlight.

In Example AA6, the subject matter of any one of Examples AA1-AA5 can optionally include where the display is an OLED display and the brightness is reduced by initializing the display with a negative contrast polarity.

Example X1 is a machine-readable storage medium including machine-readable instructions to implement a method or realize an apparatus as in any one of the Examples A1-A8, M1-M6, or AA1-AA6. Example Y1 is an apparatus comprising means for performing any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:
1. An electronic device comprising:
   a battery;
   a display;

an embedded controller to determine a battery condition of the battery and set an indicator before memory initialization, during a pre-CPU reset stage of a current boot process when the battery condition is in a low power state, wherein the embedded controller sets the indicator in a memory region accessible to basic input/output system (BIOS); and the BIOS, wherein, before an operating system stage of the boot process, the BIOS reads the indicator from the memory region and sets a brightness of the display at a native brightness if the indicator is not set and sets the brightness of the display at a low power brightness to reduce the brightness of the display to a reduced nonzero brightness level if the indicator is set.

2. The electronic device of claim 1, wherein the electronic device is connected to an external power source using a USB-C cable.

3. The electronic device of claim 2, wherein the USB-C cable supplies fifteen watts of power or less during a boot up process.

4. The electronic device of claim 1, wherein the display is a liquid crystal display and the brightness is reduced by reducing a backlight.

5. The electronic device of claim 1, wherein the display is an OLED display and the brightness is reduced by initializing the display with a negative contrast polarity.

6. The electronic device of claim 1, wherein the indicator is also set if the electronic device is updating firmware or an operating system.

7. The electronic device of claim 1, wherein the battery condition is at the low power state when a capacity level of the battery is four percent or less.

8. A method comprising:
   determining that an electronic device with a display is powered on using a battery;
   starting a boot process for the electronic device;
   determining a battery condition of the battery;
   setting an indicator in a memory region accessible to basic input/output system (BIOS) before memory initialization, during a pre-CPU reset stage during the current boot process if the battery condition is at a low power state;
   reading, by the BIOS, the indicator from the memory region; and
   setting a brightness of the display to a native brightness if the indicator is not set; and
   setting the brightness of the display to a low power brightness to reduce the brightness of the display to a reduced nonzero brightness level if the indicator is set.

9. The method of claim 8, wherein an embedded controller determines the battery condition before a central processing unit of the electronic device is reset.

10. The method of claim 8, wherein a basic input/output system (BIOS) causes the brightness of the display to be set to a low power brightness if the indicator is set.

11. The method of claim 8, wherein the brightness of the display is set before an operating system stage of the boot process.

12. The method of claim 8, wherein the display is liquid crystal display and the brightness is reduced by reducing a backlight.

13. The method of claim 8, wherein the display is an OLED display and the brightness is reduced by initializing the display with a negative contrast polarity.

14. A system for enabling pre-operating system display management, the system comprising:
   a battery;

a display;

one or more processors; and one or more instructions that, when executed by the one or more processors, cause the one or more processors to:

determine a battery condition and set an indicator in a memory region accessible to a basic input/output system (BIOS) when the battery condition is at a low power state before memory initialization, during a pre-CPU reset stage during a current boot process; and read, by the BIOS, the indicator from the memory region and set a brightness of display at a native brightness if the indicator is not set and set the brightness of the display at a low power brightness to reduce the brightness of the display to a reduced nonzero brightness level if the indicator is set.

15. The system of claim 14, further comprising:

an embedded controller to determine the battery condition before a central processing unit is reset during the boot process.

16. The system of claim 14, wherein the display is a liquid crystal display and the brightness is reduced by reducing a backlight.

17. The system of claim 14, wherein the display is an OLED display and the brightness is reduced by initializing the display with a negative contrast polarity.

18. The system of claim 17, wherein the system is connected to an external power source using a USB-C cable and the USB-C cable supplies fifteen watts of power or less during the boot process.

\* \* \* \* \*